United States Patent
Brown et al.

(10) Patent No.: US 10,352,689 B2
(45) Date of Patent: Jul. 16, 2019

(54) METHODS AND SYSTEMS FOR HIGH PRECISION LOCATIONING WITH DEPTH VALUES

(71) Applicant: SYMBOL TECHNOLOGIES, LLC, Lincolnshire, IL (US)

(72) Inventors: Patrick Martin Brown, North Medford, NY (US); Chinmay Nanda, Port Jefferson Station, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 109 days.

(21) Appl. No.: 15/008,710

(22) Filed: Jan. 28, 2016

(65) Prior Publication Data
US 2017/0219338 A1    Aug. 3, 2017

(51) Int. Cl.
*G01B 11/22*     (2006.01)
*G01B 11/00*     (2006.01)
(Continued)

(52) U.S. Cl.
CPC ............ *G01B 11/22* (2013.01); *G01B 11/002* (2013.01); *G01B 11/2518* (2013.01);
(Continued)

(58) Field of Classification Search
CPC ... G01B 11/22; G01B 11/002; G01B 11/2518; G01B 11/03; G01B 11/0616
See application file for complete search history.

(56) References Cited

U.S. PATENT DOCUMENTS

| | | |
|---|---|---|
| 5,214,615 A | 5/1993 | Bauer |
| 5,408,322 A | 4/1995 | Hsu et al. |

(Continued)

FOREIGN PATENT DOCUMENTS

| | | |
|---|---|---|
| CA | 2835830 A1 | 11/2012 |
| CN | 104200086 A | 12/2014 |

(Continued)

OTHER PUBLICATIONS

International Search Report and Written Opinion for International Patent Application No. PCT/US2017/024847 dated Jul. 7, 2017.
(Continued)

*Primary Examiner* — Mamadou L Diallo
(74) *Attorney, Agent, or Firm* — Yuri Astvatsaturov (57) ABSTRACT

Described herein are methods and systems for high-precision locationing with depth values. One embodiment takes the form of a method that includes: receiving multiple depth values that correspond respectively to depth readings from multiple depth sensors positioned on a freight-moving vehicle and oriented towards an overhead surface, wherein different portions of the overhead surface are positioned at different heights above a floor surface, determining a position and orientation of the freight-moving vehicle at least in part by querying a lookup table using the received multiple depth values, wherein the lookup table maps respective heights of the respective different portions of the overhead surface to known positions of the different portions of the overhead surface; and outputting the determined position and orientation of the freight-moving vehicle.

20 Claims, 7 Drawing Sheets

(51) Int. Cl.
  *G01B 11/25* (2006.01)
  *G01S 17/06* (2006.01)
  *G01S 17/87* (2006.01)
  *G01S 7/48* (2006.01)

(52) U.S. Cl.
  CPC ............ *G01S 7/4808* (2013.01); *G01S 17/06* (2013.01); *G01S 17/87* (2013.01)

(56) References Cited

U.S. PATENT DOCUMENTS

| | | |
|---|---|---|
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,137,207 B2 | 11/2006 | Armstrong et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,284,988 B2 | 10/2012 | Sones et al. |
| 8,423,431 B1 | 4/2013 | Rouaix et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,989,342 B2 | 3/2015 | Liesenfelt et al. |
| 9,007,601 B2 | 4/2015 | Steffey et al. |
| 9,070,285 B1 | 6/2015 | Ramu |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,329,269 B2 | 5/2016 | Zeng |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,549,125 B1* | 1/2017 | Goyal ............... H04N 21/4728 |
| 9,562,971 B2 | 2/2017 | Shenkar et al. |
| 9,600,892 B2 | 3/2017 | Patel et al. |
| 9,778,388 B1* | 10/2017 | Connor ............... G01V 1/3817 |
| 9,791,862 B1* | 10/2017 | Connor ............... G05D 1/0206 |
| 2001/0041948 A1 | 11/2001 | Ross et al. |
| 2002/0164236 A1 | 7/2002 | Fukuhara et al. |
| 2002/0158453 A1* | 10/2002 | Levine ............... B60K 23/02 |
| | | 280/735 |
| 2003/0003925 A1 | 1/2003 | Suzuki |
| 2003/0174891 A1 | 9/2003 | Wenzel et al. |
| 2004/0240754 A1 | 2/2004 | Smith et al. |
| 2005/0016004 A1 | 1/2005 | Armstrong et al. |
| 2005/0114059 A1 | 5/2005 | Chang et al. |
| 2006/0032915 A1 | 2/2006 | Schwartz |
| 2006/0106742 A1 | 5/2006 | Bocchicchio et al. |
| 2007/0074410 A1 | 4/2007 | Armstrong et al. |
| 2007/0272732 A1 | 11/2007 | Hindmon |
| 2008/0025565 A1 | 1/2008 | Zhang et al. |
| 2008/0238919 A1 | 10/2008 | Pack |
| 2008/0294487 A1 | 11/2008 | Nasser |
| 2009/0024353 A1 | 1/2009 | Lee et al. |
| 2009/0088975 A1* | 4/2009 | Sato ............... G01C 17/38 |
| | | 701/472 |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0192921 A1 | 7/2009 | Hicks |
| 2009/0206161 A1 | 8/2009 | Olmstead |
| 2009/0323121 A1 | 12/2009 | Valkenburg et al. |
| 2010/0026804 A1* | 2/2010 | Tanizaki ............ G01C 21/3629 |
| | | 348/148 |
| 2010/0070365 A1 | 3/2010 | Siotia et al. |
| 2010/0091094 A1 | 4/2010 | Sekowski |
| 2010/0118116 A1 | 5/2010 | Tomasz |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Stettner |
| 2010/0214873 A1 | 8/2010 | Somasundaram et al. |
| 2010/0295850 A1 | 11/2010 | Katz |
| 2010/0315412 A1 | 12/2010 | Sinha et al. |
| 2010/0326939 A1 | 12/2010 | Clark et al. |
| 2011/0047636 A1* | 2/2011 | Stachon ............... A01G 7/00 |
| | | 800/260 |
| 2011/0052043 A1 | 3/2011 | Hung |
| 2011/0137527 A1 | 6/2011 | Simon et al. |
| 2011/0168774 A1 | 7/2011 | Magal |
| 2011/0172875 A1* | 7/2011 | Gibbs ............... B65G 67/20 |
| | | 701/31.4 |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0075342 A1 | 3/2012 | Choubassi et al. |
| 2012/0169530 A1 | 7/2012 | Padmanabhan et al. |
| 2012/0179621 A1 | 7/2012 | Moir et al. |
| 2012/0185112 A1* | 7/2012 | Sung ............... G08G 1/096741 |
| | | 701/1 |
| 2012/0201466 A1 | 8/2012 | Funayama et al. |
| 2012/0209553 A1 | 8/2012 | Doytchinov et al. |
| 2012/0236119 A1 | 9/2012 | Rhee |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0119138 A1 | 5/2013 | Winkel |

(56) References Cited

U.S. PATENT DOCUMENTS

| | | |
|---|---|---|
| 2013/0134178 A1 | 5/2013 | Lu |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0226344 A1 | 8/2013 | Wong et al. |
| 2013/0228620 A1 | 9/2013 | Ahern et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi |
| 2014/0003655 A1 | 1/2014 | Gopalkrishnan et al. |
| 2014/0003727 A1 | 1/2014 | Lortz et al. |
| 2014/0019311 A1 | 1/2014 | Tanaka |
| 2014/0028837 A1 | 1/2014 | Gao et al. |
| 2014/0049616 A1 | 2/2014 | Stettner |
| 2014/0098094 A1 | 4/2014 | Neumann |
| 2014/0100813 A1 | 4/2014 | Showering |
| 2014/0104413 A1 | 4/2014 | McCloskey et al. |
| 2014/0192050 A1 | 7/2014 | Qiu |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0300637 A1 | 10/2014 | Fan et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0029339 A1 | 1/2015 | Kobres et al. |
| 2015/0088618 A1* | 3/2015 | Basir .............. G07B 15/063 705/13 |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0154467 A1 | 6/2015 | Feng |
| 2015/0161793 A1 | 6/2015 | Takahashi |
| 2015/0181198 A1 | 6/2015 | Baele et al. |
| 2015/0262116 A1 | 9/2015 | Katircioglu et al. |
| 2015/0363758 A1 | 12/2015 | Wu et al. |
| 2015/0379704 A1 | 12/2015 | Chandrasekar et al. |
| 2016/0044862 A1* | 2/2016 | Kocer .............. A01C 23/007 111/118 |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi |
| 2016/0107690 A1* | 4/2016 | Oyama .............. B62D 15/0285 701/41 |
| 2016/0112628 A1 | 4/2016 | Super et al. |
| 2016/0150217 A1 | 5/2016 | Popov |
| 2016/0156898 A1 | 6/2016 | Ren et al. |
| 2016/0163067 A1 | 7/2016 | Williams |
| 2016/0328618 A1 | 11/2016 | Patel et al. |
| 2016/0353099 A1 | 12/2016 | Thomson et al. |
| 2017/0004649 A1 | 1/2017 | Collet Romea et al. |
| 2017/0041553 A1 | 2/2017 | Cao et al. |
| 2017/0066459 A1* | 3/2017 | Singh .............. B61L 23/044 |
| 2017/0150129 A1 | 5/2017 | Pangrazio |
| 2017/0227647 A1 | 8/2017 | Baik |
| 2017/0228885 A1 | 8/2017 | Baumgartner |

FOREIGN PATENT DOCUMENTS

| | | |
|---|---|---|
| EP | 0766098 A1 | 4/1997 |
| EP | 1311993 B1 | 5/2007 |
| EP | 2439487 A1 | 4/2012 |
| EP | 2472475 A1 | 7/2012 |
| EP | 2562688 A2 | 2/2013 |
| EP | 2662831 A2 | 11/2013 |
| EP | 2693362 A1 | 2/2014 |
| GB | 2323238 A | 9/1998 |
| GB | 2330265 A | 4/1999 |
| KR | 101234798 B1 | 1/2009 |
| WO | 2003/002935 A1 | 1/2003 |
| WO | 2003025805 A1 | 3/2003 |
| WO | 2006136958 A3 | 12/2006 |
| WO | 2007042251 A2 | 4/2007 |
| WO | 2008/057504 A2 | 5/2008 |
| WO | 2014/092552 A2 | 5/2008 |
| WO | 2008/154611 A2 | 12/2008 |
| WO | 2013/165674 | 11/2013 |
| WO | 2014181323 A1 | 11/2014 |
| WO | 2015/127503 A1 | 9/2015 |
| WO | 2016/020038 A1 | 2/2016 |

OTHER PUBLICATIONS

"Fair Billing with Automatic Dimensioning" pp. 1-4, undated, Copyright Mettler-Toledo International Inc.

"Swift Dimension" Trademark Omniplanar, Copyright 2014.

"Plane Detection in Point Cloud Data" dated Jan. 25, 2010 by Michael Ying Yang and Wolfgang Forstner, Technical Report 1, 2010, University of Bonn.

Brown et al., U.S. Appl. No. 15/078,074, filed Mar. 23, 2016.

Fu et al., U.S. Appl. No. 15/385,113, filed Dec. 20, 2016.

Lecking et al., "Localization in a wide range of industrial environments using relative 3D ceiling features," IEEE, pp. 333-337, Sep. 15, 2008.

Carreira et al., "Enhanced PCA-based localization using depth maps with missing data," IEEE, pp. 1-8 ,Apr. 24, 2013.

Clayton et al., U.S. Appl. No. 15/358,810, filed Nov. 22, 2016.

Swope et al., U.S. Appl. No. 15/015,228, filed Feb. 4, 2016.

Ziang Xie et al., "Multimodal Blending for High-Accuracy Instance Recognition", 2013 IEEE/RSJ International Conference on Intelligent Robots and Systems, pp. 2214-2221.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Federico Tombari et al. "Multimodal cue integration through Hypotheses Verification for RGB-D object recognition and 6DOF pose estimation", IEEE International Conference on Robotics and Automation, Jan. 2013.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Gu et al., U.S. Appl. No. 15/242,126, filed Aug. 19, 2016.

Dubois, M., et al., "A comparison of geometric and energy-based point cloud semantic segmentation methods," European Conference on Mobile Robots (ECMR), vol., No., pp. 88-93, Sep. 25-27, 2013.

Lari, Z., et al., "An adaptive approach for segmentation of 3D laser point cloud." International Archives of the Photogrammetry, Remote Sensing and Spatial Information Sciences, vol. XXXVIII-5/W12, 2011, ISPRS Calgary 2011 Workshop, Aug. 29-31, 2011, Calgary, Canada.

Rusu, et al. "Spatial change detection on unorganized point cloud data," PCL Library, retrieved from Internet on Aug. 19, 2016 [http://pointclouds.org/documentation/tutorials/octree_change.php].

Tahir, Rabbani, et al., "Segmentation of point clouds using smoothness constraint," International Archives of Photogrammetry, Remote Sensing and Spatial Information Sciences 36.5 (Sep. 2006): 248-253.

(56) References Cited

OTHER PUBLICATIONS

Golovinskiy, Aleksey, et al. "Min-cut based segmentation of point clouds." Computer Vision Workshops (ICCV Workshops), 2009 IEEE 12th International Conference on. IEEE, 2009.
Douillard, Bertrand, et al. "On the segmentation of 3D LIDAR point clouds." Robotics and Automation (ICRA), 2011 IEEE International Conference on. IEEE, 2011.
Puwein, J., et al., "Robust multi-view camera calibration for wide-baseline camera networks," in IEEE Workshop on Applications of Computer Vision (WACV), Jan. 2011.
Datta, A., et al., "Accurate camera calibration using iterative refinement of control points," in Computer Vision Workshops (ICCV Workshops), 2009.
Olson, Clark F., et al. "Wide-Baseline Stereo Vision for Terrain Mapping" in Machine Vision and Applications, Aug. 2010.
Rusu, et al., "How to incrementally register pairs of clouds," PCL Library, retrieved from the Internet on Aug. 22, 2016 from <http://pointclouds.org/documentation/tutorials/pairwise_incremental_registration.php>.
Zheng et al., U.S. Appl. No. 15/131,856, filed Apr. 18, 2016.
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Schnabel et al. "Efficient RANSAC for Point-Cloud Shape Detection", vol. 0, No. 0, pp. 1-12.
Buenaposada et al. "Real-time tracking and estimation of plane pose" Proceedings of the ICPR (Aug. 2002) vol. II, IEEE pp. 697-700.
International Search Report and Written Opinion for corresponding International Patent Application No. PCT/US2016/064110 dated Mar. 20, 2017.
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
Bohm, "Multi-Image Fusion for Occlusion-Free Facade Texturing", International Archives of the Photogrammetry, Remote Sensing and Spatial Information Sciences, pp. 867-872 (Jan. 2004).
Senthilkumaran, et al., "Edge Detection Techniques for Image Segmentation—A Survey of Soft Computing Approaches", International Journal of Recent Trends in Engineering, vol. 1, No. 2 (May 2009).
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Uchiyama, et al., "Removal of Moving Objects from a Street-View Image by Fusing Multiple Image Sequences", Pattern Recognition, 2010, 20th International Conference on, IEEE, Piscataway, NJ, pp. 3456-3459 (Aug. 23, 2010).
Tseng, et al., "A Cloud Removal Approach for Aerial Image Visualization", International Journal of Innovative Computing, Information & Control, vol. 9 No. 6, pp. 2421-2440 (Jun. 2013).
United Kingdom Intellectual Property Office, Combined Search and Examination Report dated Mar. 11, 2015 for GB Patent Application No. 1417218.3.
United Kingdom Intellectual Property Office, Examination Report dated Jan. 22, 2016 for GB Patent Application No. 1417218.3 (2 pages).
United Kingdom Intellectual Property Office, Combined Search and Examination Report dated Jan. 22, 2016 for GB Patent Application No. 1521272.3 (6 pages).
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 15/211,103 dated Apr. 5, 2017.
Notice of allowance for U.S. Appl. No. 14/518,091 dated Apr. 12, 2017.
U.S. Appl. No. 15/583,680, filed May 1, 2017.
U.S. Appl. No. 15/583,801, filed May 1, 2017.
U.S. Appl. No. 15/583,740, filed May 1, 2017.
U.S. Appl. No. 15/583,717, filed May 1, 2017.
U.S. Appl. No. 15/583,773, filed May 1, 2017.
U.S. Appl. No. 15/583,786, filed May 1, 2017.
U.S. Appl. No. 15/583,759, filed May 1, 2017.
International Patent Application Serial No. PCT/CN2017/083143 filed May 5, 2017.
International Search Report and Written Opinion for International Application No. PCT/US2018/030345 dated Sep. 17, 2018.

* cited by examiner

| 10 | 19 | 28 | 37 | 46 | 55 | 64 | 73 | 1 |
|----|----|----|----|----|----|----|----|----|
| 21 | 30 | 39 | 48 | 57 | 66 | 75 | 3 | 12 |
| 34 | 43 | 52 | 61 | 70 | 79 | 7 | 16 | 25 |
| 45 | 54 | 63 | 72 | 81 | 9 | 18 | 27 | 36 |
| 59 | 41 | (23) | 77 | 50 | 5 | 14 | (68) | 32 |
| 56 | 65 | 74 | 2 | 11 | 20 | 29 | 38 | 47 |
| 67 | 76 | 4 | 13 | 22 | 31 | 40 | 49 | 58 |
| 78 | 6 | 15 | 24 | 33 | 42 | 51 | 60 | 69 |
| 80 | 71 | 62 | 53 | 44 | 35 | 26 | 17 | 8 |

| 1 | 20 | 13 | 17 | 16 | 8 | 19 | 22 | 16 |
|----|----|----|----|----|----|----|----|----|
| 15 | 7 | 3 | 7 | 6 | 16 | 25 | 6 | 26 |
| 5 | 11 | 13 | 2 | 27 | 11 | 1 | 22 | 11 |
| 21 | 10 | 1 | 18 | 19 | 22 | 8 | 18 | 12 |
| 15 | 24 | 17 | 14 | 23 | 4 | 8 | 27 | 25 |
| 21 | 10 | 20 | 23 | 26 | 14 | 26 | 4 | 12 |
| 18 | 24 | 3 | 12 | 2 | 27 | 2 | 21 | 16 |
| 10 | 7 | 9 | 23 | 20 | 24 | 9 | 6 | 15 |
| 5 | 17 | 13 | 5 | 9 | 3 | 14 | 4 | 25 |

METHODS AND SYSTEMS FOR HIGH PRECISION LOCATIONING WITH DEPTH VALUES

BACKGROUND OF THE INVENTION

Three dimensional point clouds can be used to determine dimensions of various objects. In the context of moving freight, point clouds can capture freight and a freight-moving vehicle in motion. Dimensions of the freight can be improved by separating the freight-moving vehicle from the freight and determining the dimensions of the separated freight. However, this leads to delays in moving the freight.

Accordingly, there is a need for methods and systems for high precision locationing with depth values.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One embodiment takes the form of a method that includes receiving multiple depth values that correspond respectively to depth readings from multiple depth sensors positioned on a freight-moving vehicle and oriented towards an overhead surface, wherein different portions of the overhead surface are positioned at different heights above a floor surface, wherein each of the multiple depth values is representative of a distance between a respective one of the depth sensors and a respective different portion of the overhead surface; determining a position and orientation of the freight-moving vehicle at least in part by querying a lookup table using the received multiple depth values, wherein the lookup table maps respective heights of the respective different portions of the overhead surface to known positions of the different portions of the overhead surface; and outputting the determined position and orientation of the freight-moving vehicle.

Another embodiment takes the form of a system that includes a communication interface, a processor, and data storage containing instructions executable by the processor for carrying out at least the functions described in the preceding paragraph.

In one embodiment, the overhead surface is a planar surface oriented at an angle with respect to the floor surface, and the multiple depth sensors include a first and a second depth sensor, and a third depth sensor not in line with the first and second depth sensors.

In one embodiment, the different portions of the overhead surface include a grid of depth elements, the multiple depth sensors comprise a first and a second depth sensor, a first depth value of the multiple depth values is associated with the first depth sensor, and a second depth value of the multiple depth values is associated with the second depth sensor. In one such embodiment, each depth element is located at a different height than each of the other depth elements; in another such embodiment, at least one depth element is located at the same height as at least one other depth element; in another such embodiment, the depth elements are spaced one centimeter apart.

In one embodiment, at least one of the multiple depth sensors is a LIDAR sensor.

In one embodiment, the multiple depth sensors are arranged in a known configuration. In one such embodiment, querying a lookup table using the received multiple depth values includes querying the lookup table using a combination of the multiple depth values to obtain the position and orientation of the freight-moving vehicle.

In one embodiment, the method further includes: determining a collective geometric shape of (i) freight being carried by the freight-moving vehicle and (ii) at least a portion of the freight-moving vehicle, isolating a geometric shape of the freight at least in part by segmenting the geometric shape of the at least a portion of the freight-moving vehicle from the collective geometric shape based at least in part on the determined position and orientation of the freight-moving vehicle, and dimensioning the freight based on the isolated geometric shape of the freight. In one such embodiment isolating a geometric shape of the freight further comprises: determining an identity of the freight-moving vehicle, and receiving a geometric shape of the freight-moving vehicle based on the determined identity, wherein segmenting the geometric shape of the at least a portion of the freight-moving vehicle from the collective geometric shape is further based on the received geometric shape of the freight-moving vehicle.

One embodiment is a system that includes: an overhead grid comprising a plurality of depth elements of varying depths; a freight-moving vehicle comprising at least three depth sensors positioned on the freight-moving vehicle and oriented towards the overhead grid and configured to measure a respective depth to a respective depth element currently positioned above the respective depth sensor, and a processor configured to: receive respective depth values from the plurality of depth sensors; determine a position and orientation of the freight-moving vehicle at least in part by querying a database using the received multiple depth values, wherein the database maps respective depths of respective depth elements in the overhead grid to known Cartesian positions of the depth elements in the overhead grid; determine a collective geometric shape of (i) freight being carried by the freight-moving vehicle and (ii) at least a portion of the freight-moving vehicle; isolating a geometric shape of the freight at least in part by segmenting the geometric shape of the at least a portion of the freight-moving vehicle from the collective geometric shape based at least in part on the determined position and orientation of the freight-moving vehicle, and outputting the isolated geometric shape of the freight.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

Figure 1:
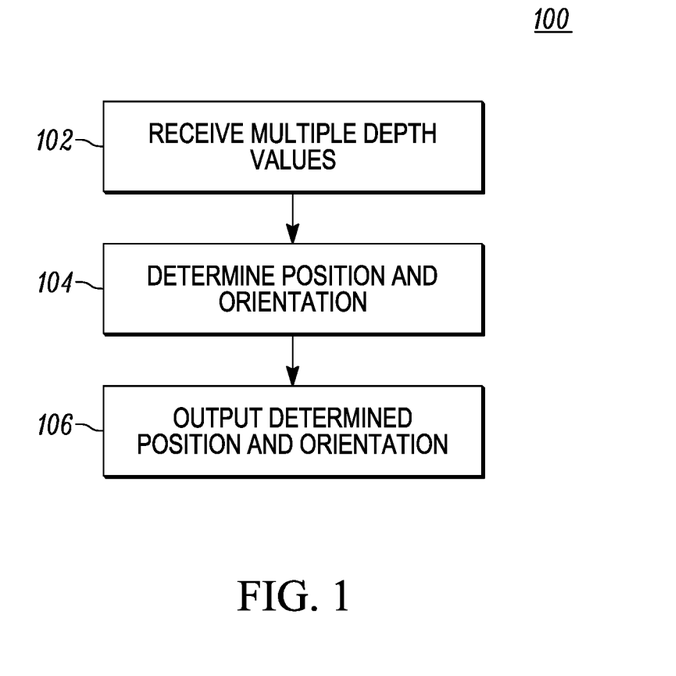
FIG. 1 depicts a method, in accordance with some embodiments.

FIG. 1 depicts a method, in accordance with some embodiments. In particular, FIG. 1 depicts the method 100. The method 100 includes receiving multiple depth values at step 102, determining position and orientation at step 104, and outputting the determined position and orientation at step 106.

At step 102, multiple depth values are received. The multiple depth values correspond respectively to depth readings from multiple depth sensors positioned on a freight-moving vehicle and oriented towards an overhead surface. Different portions of the overhead surface are positioned at different heights above a floor surface, and each of the multiple depth values is representative of a distance between a respective one of the depth sensors and a respective different portion of the overhead surface.

In some embodiments, the at least one depth sensor is a LIDAR sensor. In some embodiments, the multiple depth sensors are arranged in a known configuration.

At step 104, the position and orientation is determined. In one embodiment, the position and orientation of a freight-moving vehicle is determined at least in part by querying a lookup table using the received multiple depth values. The lookup table may take many forms, one of them being a database, and maps respective heights of the respective different portions of the overhead surface to known At step 106, the determined position and orientation is output. Outputting the position and orientation may include outputting the determined position and orientation to an application, a different computer, a user interface, or the like.

Figure 2:
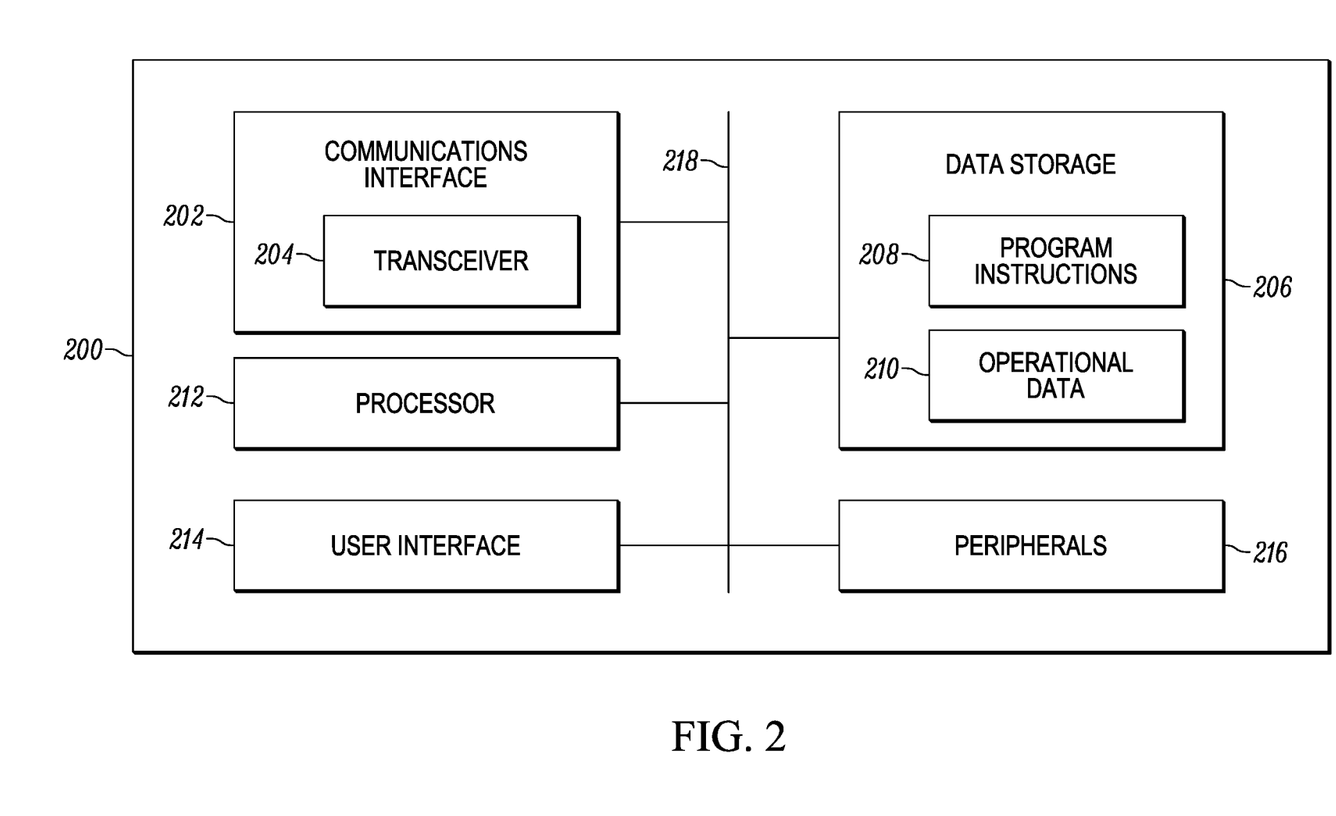
FIG. 2 depicts a block diagram of a computer processing system, in accordance with some embodiments.

FIG. 2 depicts a block diagram of a computer processing system, in accordance with some embodiments. In particular, FIG. 2 depicts the computer processing system 200. The computer processing system 200 includes a communications interface 202 (that includes a transceiver 204), data storage 206 (that contains program instructions 208 and operational data 210), a processor 212, a user interface 214, peripherals 216, and a communication bus 218. This arrangement is presented by way of example and not limitation, as other example arrangements could be described here.

The computer processing system 200 may be found in portions of the disclosed invention, to include the depth sensors or the scanners, or may be programmed to perform the methods disclosed herein. Not all elements depicted as part of the computer processing system 200 are required in all elements. As just one example, the computer processing system in one of the depth sensors may be equipped with a transceiver 204 if it connects wirelessly to a different computer processing system, however in some embodiments, the depth sensor may be wired to a different computer processing system and the transceiver 204 is not required.

As stated above, the communication interface 202 includes the transceiver 204. The transceiver 204 may be configured (e.g., tuned) to receive and transmit on one of a set of channels. The transceiver 204 may be a single component, or realized as a separate transmitter and receiver, as known by those with skill in the art. The communication interface 202 may be configured to be operable for communication according to one or more wireless-communication protocols, some examples of which include LMR, LTE, APCO P25, ETSI DMR, TETRA, Wi-Fi, Bluetooth, and the like. The communication interface 202 may also include one or more wired-communication interfaces (for communication according to, e.g., Ethernet, USB, and/or one or more other protocols.) The communication interface 202 may include any necessary hardware (e.g., chipsets, antennas, Ethernet interfaces, etc.), any necessary firmware, and any necessary software for conducting one or more forms of communication with one or more other entities as described herein.

The data storage 206 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, the data storage 206 contains program instructions 208 executable by the processor 212 for carrying out various functions described herein, and further is depicted as containing and operational data 210, which may include any one or more data values stored by and/or accessed by the computing device in carrying out one or more of the functions described herein.

The processor 212 may include one or more processors of any type deemed suitable by those of skill in the relevant art, some examples including a general-purpose microprocessor and a dedicated digital signal processor (DSP).

The user interface 214 may include one or more input devices (a.k.a. components and the like) and/or one or more output devices (a.k.a. components and the like.) With respect to input devices, the user interface 214 may include one or more touchscreens, buttons, switches, microphones, and the like. With respect to output devices, the user interface 214 may include one or more displays, speakers, light emitting diodes (LEDs), and the like. Moreover, one or more components (e.g., an interactive touchscreen and display) of the user interface 214 could provide both user-input and user-output functionality. Other user interface components could also be present, as known to those of skill in the art.

The peripherals 216 may include any computing device accessory, component, or the like, that is accessible to and useable by the computing device during operation. Example peripherals 216 include a GPS receiver, an altimeter, an RSSI sensor, a motion sensor and the like.

In an embodiment, the various components of the computer processing system 200 are all communicatively coupled with one another via a communication bus 218 (or other suitable communication network, or the like.)

Figure 3A:
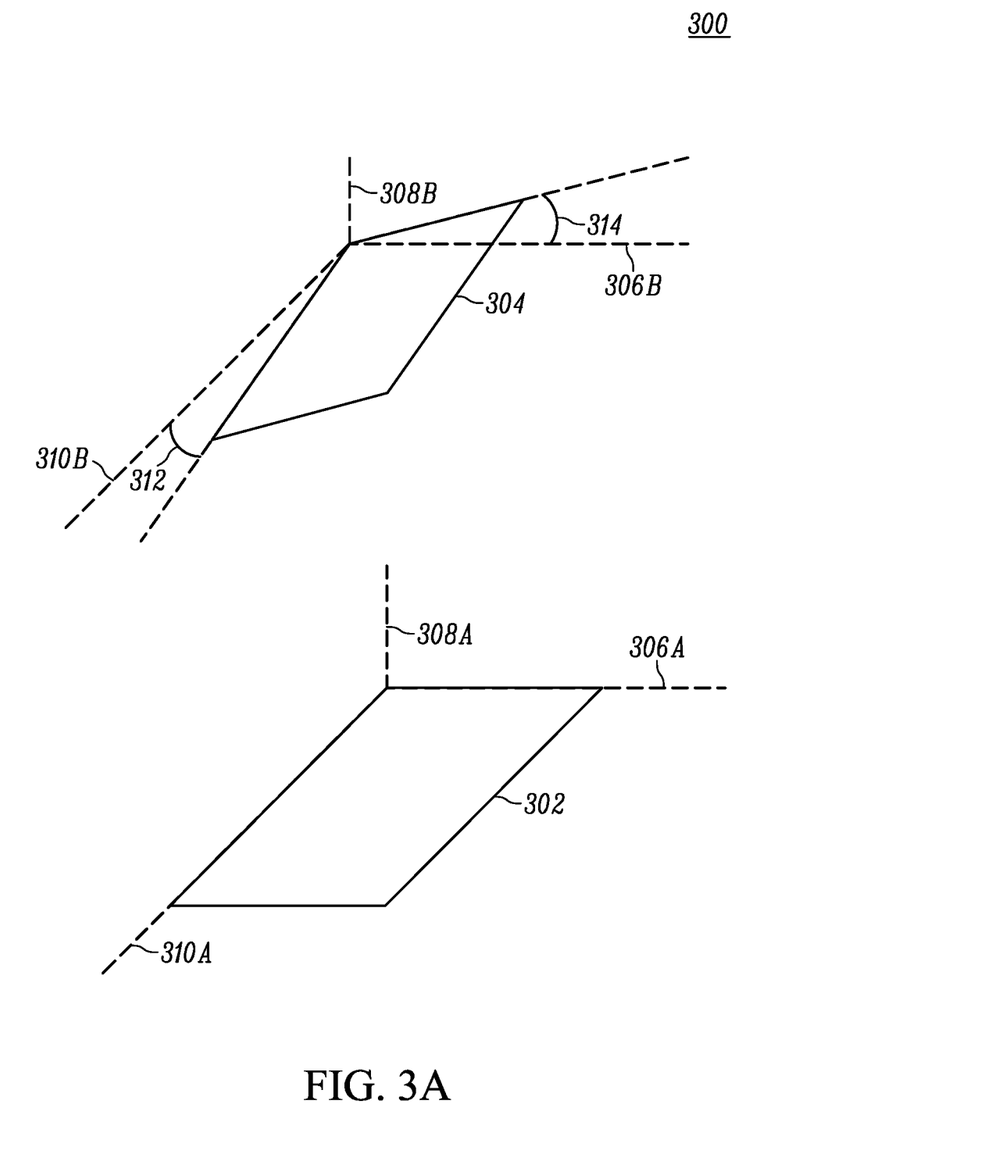
FIG. 3A depicts a view a floor and overhead surface, in accordance with some embodiments.

FIG. 3A depicts a view a floor and overhead surface, in accordance with some embodiments. In particular, FIG. 3A depicts the view 300. The view 300 includes a floor surface 302, an overhead surface 304, projections of the x, y, and z-axis, 306A, 308A, and 310A, respectively, projections of the x, y, and z-axis, 306B, 308B, and 310B, respectively, a first angle 312, and a second angle 314.

In one embodiment, the overhead surface is a planar surface oriented at an angle with respect to the floor surface. In FIG. 3A, the floor surface is a planar surface and intersects both the x-axis projection 306A and the z-axis projection 310A. The overhead surface 304 is a planar surface. However, the overhead surface 304 is oriented at an angle to the floor surface 302. Here, the overhead surface 304 is at the first angle 312 with the z-axis projection 310B and the second angle 314 with the x-axis projection 306B. Different portions of the overhead surface 304 are located at different heights above the floor surface 302.

Figure 3B:
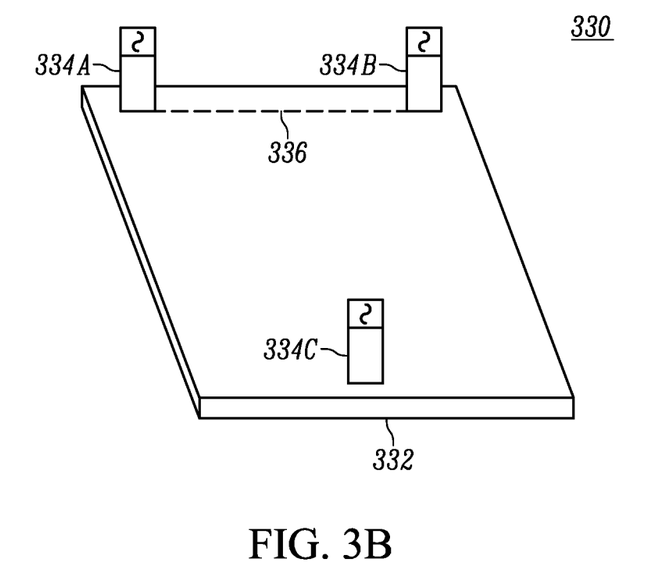
FIG. 3B depicts an arrangement of depth sensors, in accordance with some embodiments.

FIG. 3B depicts an arrangement of depth sensors, in accordance with some embodiments. In particular, FIG. 3B depicts the arrangement 330. The arrangement 330 includes a portion of a vehicle portion 332, a first depth sensor 334A, a second depth sensor 334B, a third depth sensor 334C, and a line 336.

In one embodiment, the multiple depth sensors include a first and a second depth sensor, and a third depth sensor not in line with the first and second depth sensors. In FIG. 3B, the depth sensors 334A-C are arranged on the vehicle portion 332. The first and second depth sensors 334A and 334B are arranged along the line 336, and the third depth sensor 334C is not along the line 336.

Figure 3C:
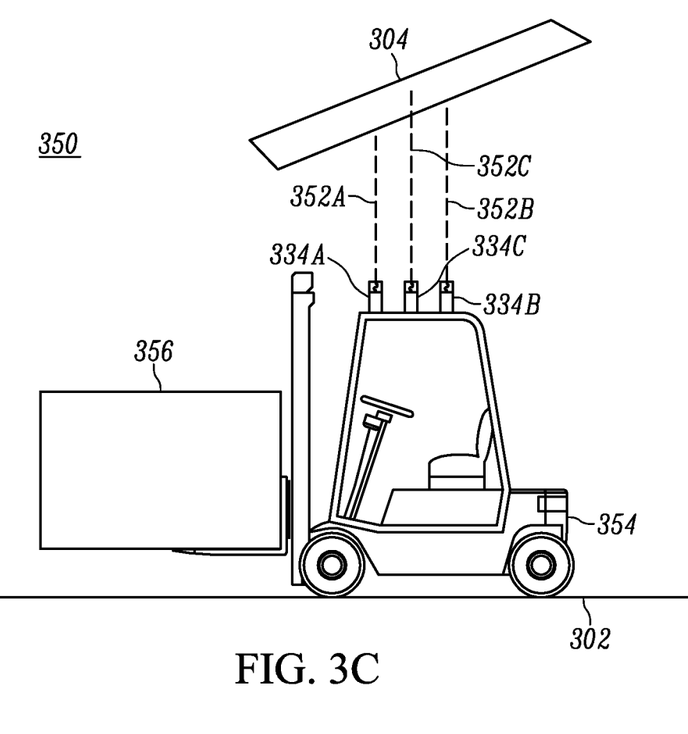
FIG. 3C depicts an overview of a system, in accordance with some embodiments.

FIG. 3C depicts an overview of a system, in accordance with some embodiments. In particular, FIG. 3C depicts the system 350. The system 350 includes the floor surface 302 and the overhead surface 304 from FIG. 3A, the depth sensors 334A-C from FIG. 3B, depth readings 352A-C, a freight moving vehicle 354, and freight 356.

The freight-moving vehicle 354 carries the freight 356 as it drives over the floor surface 302. The multiple depth sensors are positioned on the freight-moving vehicle and oriented towards the overhead surface 304. The multiple depth sensors are configured to obtain depth values to the overhead surface, wherein each of the received depth values is representative of a distance between a respective one of the depth sensors and a respective different portion of the overhead surface. Here, the depth readings 352A-C are representative of the distances between the depth sensor 334A-C, respectively, and the portions of the overhead surface 304 above the respective depth sensor 334A-C.

The position and orientation of the freight-moving vehicle 354 can be determined at least in part by querying a lookup table using the received multiple depth values.

Figure 4A:
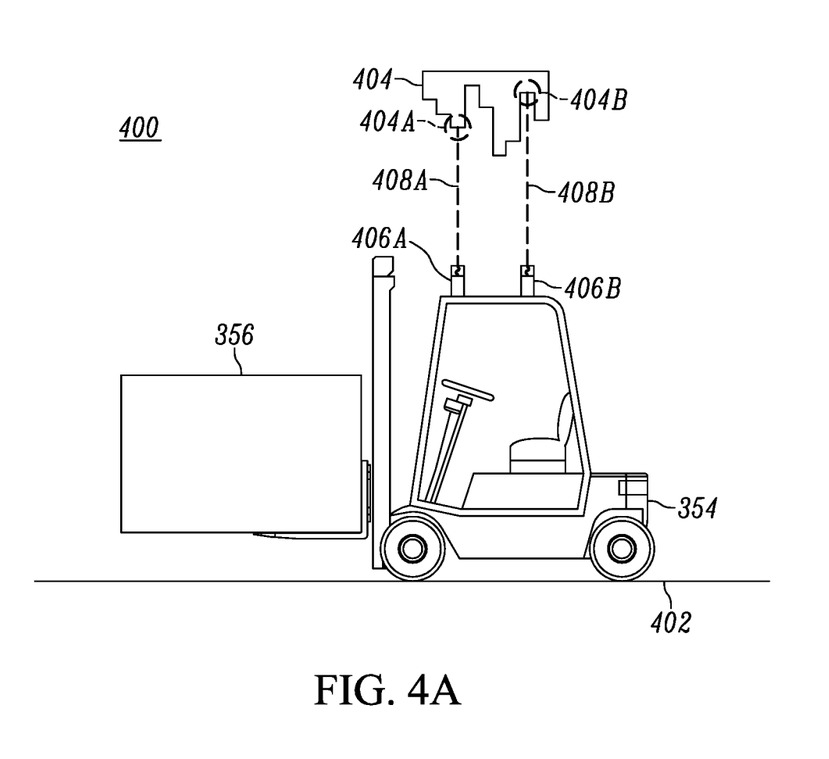
FIG. 4A depicts an overview of a system, in accordance with some embodiments.

FIG. 4A depicts an overview of a system, in accordance with some embodiments. In particular, FIG. 4A depicts the system 400. The system 400 includes the freight-moving vehicle 354 and the freight 356 from FIG. 3C, a floor surface 402, an overhead surface 404, a first portion of the overhead surface 404A, a second portion of the overhead surface 404B, depth sensors 406A and 406B, and depth readings 408A and 408B.

In some embodiments, the different portions of the overhead surface comprise a grid of depth elements. For simplicity, only a single column of the overhead surface 404 is depicted in FIG. 4A. The overhead surface 404 may include a plurality of columns of depth elements. In some embodiments, each depth element is located at a different height than each of the other depth elements. In some embodiments, at least one depth element is located at the same height as at least one other depth element. In some embodiments, the depth elements are 1 cm apart. In some embodiments, the depth elements are spaced apart to give a desired positional accuracy.

Similar to the system 300 depicted in FIG. 3C, FIG. 4A depicts the freight-moving vehicle 354 carrying freight 356 over the floor surface 402 and under the overhead surface 404. The depth readings 408A-B are representative of the distances between the depth sensors 406A-B and the portions of the overhead surface above the depth sensors 404A-B, respectively.

Figure 4B:
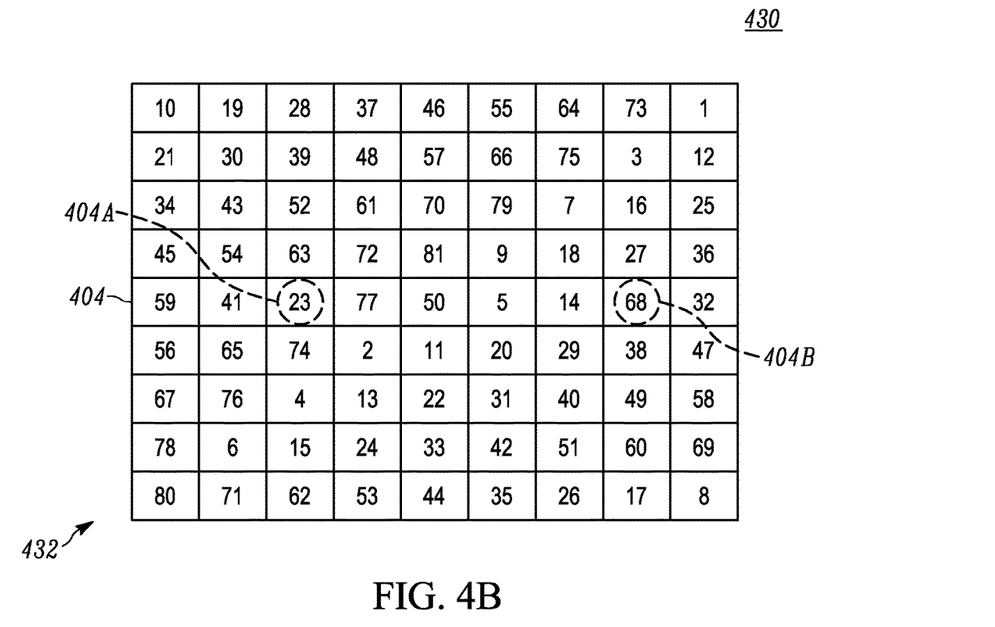
FIG. 4B depicts a view of an overhead surface, in accordance with some embodiments.

FIG. 4B depicts a view of an overhead surface, in accordance with some embodiments. In particular, FIG. 4B depicts the view 430. The view 430 includes the grid 432. The grid 432 comprises nine columns and nine rows of depth elements, with each depth element being one of 81 different heights. The view depicts square depth elements, with the number indicating a height above a floor surface or a depth sensor.

In particular, the grid 432 depicts the depth values for grid elements in the column 404 depicted in FIG. 4A. The respective heights of the depth elements in column 404, from left to right, are 59, 41, 23, 77, 50, 5, 14, 68, and 32. Grid elements with a larger the respective height are located higher above the floor surface the grid element.

In the example depicted in FIG. 4A the depth sensor 406A measures the depth reading 408A to the grid element 404A, and the depth sensor 406B measures the depth reading 408B to the grid element 404B. As depicted in FIG. 4B, the height associated with the depth element 404A is "23", and the height associated with the depth element 404B is "68". A lookup table mapping the respective heights of the respective different portions of the overhead grid is queried with the depth readings of "23" and "68" to determine the position and orientation of the freight-moving vehicle.

Figure 4C:
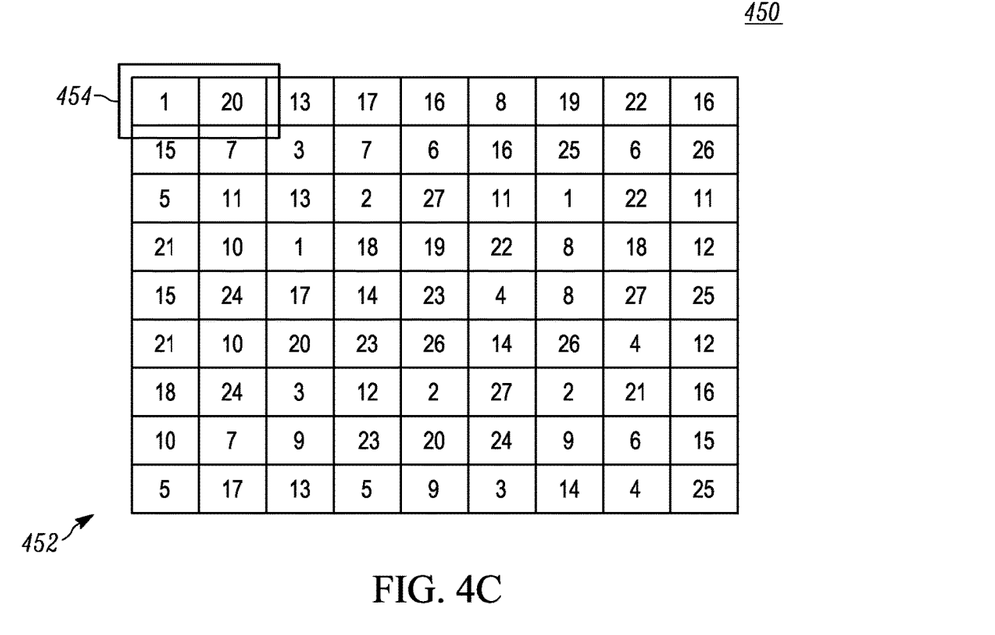
FIG. 4C depicts a view of an overhead surface, in accordance with some embodiments.

FIG. 4C depicts a view of an overhead surface, in accordance with some embodiments. In particular, FIG. 4C depicts the view 450. The view 450 includes the grid of depth elements 452. The grid 452 is similar to the grid 432 of FIG. 4B, however, the grid includes 81 different depth elements of 27 different heights, each height repeated three times. When querying a lookup table with the received depth values, each depth value may map to any one of three different depth elements where that height is located. However, when querying a lookup table with a combination of depth measurements, the position and orientation of the freight-moving vehicle can be further narrowed down, using the configuration of the depth sensors on the freight-moving vehicle. For example, in a configuration where two depth sensors are positioned at a distance of one depth element, and the two depth sensors measure heights of "1" and "20", there is only one position and orientation possible in the grid 452 that satisfies the configuration, in the top left corner.

Certainly other grid sizes and different sample heights can be used to determine the position and orientation of the freight-moving vehicle. In one embodiment, the overhead grid is size of nine meters by nine meters.

In some embodiments, each individual depth measurement corresponds to a unique position over the floor surface. In such an embodiment, with the depth sensors arranged in a known configuration, a first depth measurement associated with a first depth sensor and a second depth measurement associated with a second depth sensor provides enough information to determine a position and orientation of the freight-moving vehicle.

In some embodiments, querying the lookup table using the received multiple depth values comprises querying the lookup table using a combination of the multiple depth values to obtain the position and orientation of the freight-moving vehicle. In such an embodiment, the combination of depth measurements corresponds to a position and orientation of the freight-moving vehicle.

In one embodiment, determining the position and orientation of the freight-moving vehicle is based at least on a plurality of depth measurements representative of a height to an overhead surface from a single depth sensor. In such an embodiment, the freight-moving vehicle drives in a straight line. The position of the freight-moving vehicle is determined with each depth measurement. The orientation of the freight-moving vehicle can be determined by fitting a straight line through the plurality of determined positions.

In one embodiment, the multiple depth sensors are oriented to measure depths to the overhead surface at different angles. In such an embodiment, at least one of the multiple depth sensors is oriented to measure directly upwards towards the overhead surface and a second one of the multiple depth sensors is oriented to measure at an angle off of the vertical. The lookup table maps respective heights of the respective different portions of the overhead grid, as measured by the depth sensors scanning at different angles, to respective different portions of the overhead surface.

Figure 5A:
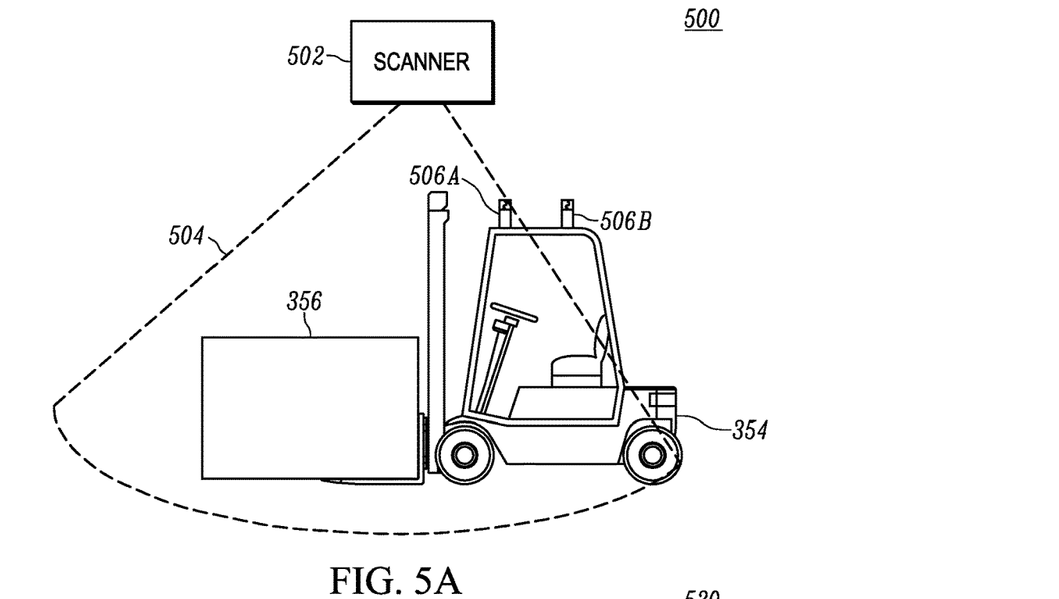
FIG. 5A depicts an overview of a system, in accordance with some embodiments.

FIG. 5A depicts an overview of a system, in accordance with some embodiments. In particular, FIG. 5A depicts the system 500. The system 500 includes a scanner 502, a scanner field-of-view 504, and depth sensors 506A-B.

In some embodiments, the method further includes determining a collective geometric shape of (i) freight being carried by the freight-moving vehicle and (ii) at least a portion of the freight-moving vehicle. In the system 500, the scanner 502 determines the geometric shape of objects within the field-of-view 504. Here, the freight 356 and portions of the freight-moving vehicle 354 are within the field-of-view 504. It may be appreciated that while FIG. 5A depicts the scanner 502 as a single scanner, it may be an array of scanners configured to determine a collective geometric shape of all objects in each scanner's field-of-view.

Figure 5B:
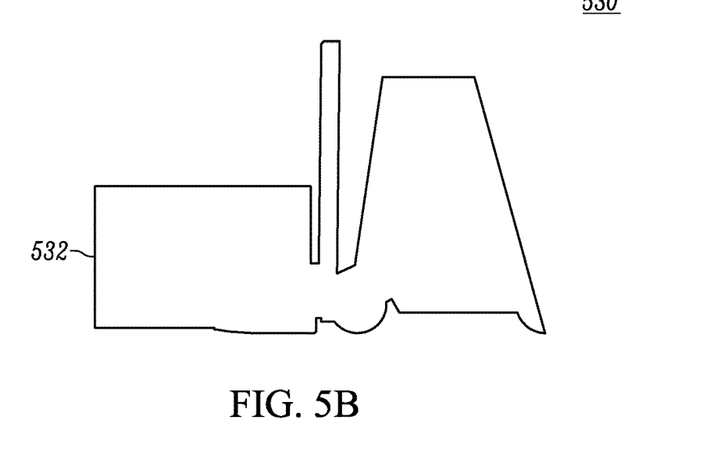
FIG. 5B depicts a view of a geometric shape, in accordance with some embodiments.

FIG. 5B depicts a view of a geometric shape, in accordance with some embodiments. In particular, FIG. 5B depicts the view 530. The view 530 includes the geometric shape 532. The geometric shape 532 is representative of the freight and the portion of the freight-moving vehicle 354 that was within the scanner field-of-view in FIG. 5A. The geometric shape 532 is depicted as an two-dimensional outline, however, those with skill in the art can appreciate that the geometric shape 532 may also be three-dimensional.

Figure 5C:
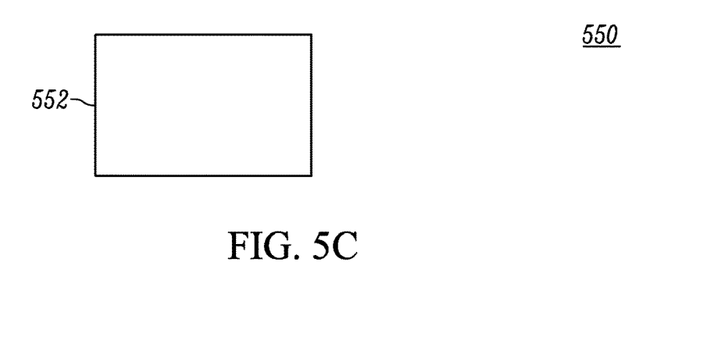
FIG. 5C depicts a view of a geometric shape, in accordance with some embodiments.

FIG. 5C depicts a view of a geometric shape, in accordance with some embodiments. In particular, FIG. 5C depicts the view 550. The view 550 includes the geometric shape 552. In some embodiments, the method further includes isolating a geometric shape of the freight at least in part by segmenting the geometric shape of the at least a portion of the freight-moving vehicle from the collective geometric shape based at least in part on the determined position and orientation of the freight-moving vehicle.

Here, based at least on the determined position of the freight moving vehicle 354 in FIG. 5A, the portion of the collective geometric shape 532 attributed to the freight-moving vehicle 354 can be separated from the freight 356.

In some embodiments, the collective geometric shape is point cloud data, or 3D (three dimensional) point cloud data. Segmenting the geometric shape of the at least a portion of the freight-moving vehicle may include deleting, filtering, or resetting point cloud points associated with the freight-moving.

The freight may then be dimensioned based on the isolated geometric shape of the freight.

In some embodiments, the method further includes calibrating the depth sensors. The profile of the freight-moving vehicle may change based on various factors, to include loading conditions of the freight. For example, heavier loads may lower the freight-moving vehicle, thus affecting the depth readings between the depth sensor and the overhead surface. The calibration may be performed in many different methods or combinations of methods. One method includes orienting a depth sensor to measure downward, measuring a height to the floor surface. The depth readings from the depth sensors orientated towards the overhead surface can then be calibrated based on the depth reading measuring the height above the floor surface.

In another embodiment, pitch and yaw angles of the freight-moving vehicle are used to calibrate the depth sensors. The pitch and yaw angles, as determined by onboard sensors or other methods known by those with skill in the art, are used to calibrate the depth sensors.

In another embodiment, the freight-moving vehicle is first driven under a portion of the overhead surface that is at a reference height above the floor surface. Next, the freight-moving vehicle is driven under portions of the overhead surface that are at different heights above the floor surface. The depth sensors are calibrated based on the measured heights to the portion of the overhead surface that is at the reference height.

In some embodiments, isolating a geometric shape of the freight further includes determining an identity of the freight-moving vehicle and receiving a geometric shape of the freight-moving vehicle based on the determined identity. Here, a freight-moving vehicle can be identified as it approaches the system that determines the freight-moving vehicle location and the collective shape. The identification may be manual (operator entered), preset, of done via a secondary scanner reading a barcode, optical tag, RFID (Radio Frequency Identification) tag associated with the freight-moving vehicle, by a trigger from a navigation system, or the like.

The received geometric shape of the freight-moving vehicle includes data necessary to attribute points in the collective geometric shape to the freight-moving vehicle, and not the freight, based on the determined position and orientation of the freight-moving vehicle.

The dimension of freight can be output to another server for use in tracking of the freight. Example methods of tracking include calculating a volume of the freight, a density of the freight, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
receiving multiple depth values read by multiple depth sensors positioned on a freight-moving vehicle and oriented towards an overhead surface disposed above the freight-moving vehicle, wherein different portions of the overhead surface are positioned at different heights above a floor surface and above the multiple depth sensors, wherein each of the multiple depth values is representative of a distance between a respective one of the depth sensors and a respective different portion of the overhead surface;
determining a position and orientation of the freight-moving vehicle at least in part by querying a lookup table by mapping the received multiple depth values to respective heights of the respective different portions of the overhead surface that correspond, in the lookup table, to known positions of the different portions of the overhead surface;
outputting the determined position and orientation of the freight-moving vehicle, and
dimensioning a freight carried by the freight-moving vehicle based at least in part on the determined position and orientation of the freight-moving vehicle.

2. The method of claim 1, wherein:
the overhead surface is a planar surface oriented at an angle with respect to the floor surface, and
the multiple depth sensors comprise a first and a second depth sensor, and a third depth sensor not in line with the first and second depth sensors.

3. The method of claim 1, wherein:
the different portions of the overhead surface comprise a grid of depth elements,
the multiple depth sensors comprise a first and a second depth sensor, a first depth value of the multiple depth values is associated with the first depth sensor, and a second depth value of the multiple depth values is associated with the second depth sensor.

4. The method of claim 3, wherein each depth element is located at a different height than each of the other depth elements.

5. The method of claim 3, wherein at least one depth element is located at the same height as at least one other depth element.

6. The method of claim 3, wherein the depth elements are spaced one centimeter apart.

7. The method of claim 1, wherein at least one of the multiple depth sensors is a LIDAR sensor.

8. The method of claim 1, wherein the multiple depth sensors are arranged in a known configuration.

9. The method of claim 8, wherein querying the lookup table by mapping the received multiple depth values comprises querying the lookup table using a combination of the multiple depth values to obtain the position and orientation of the freight-moving vehicle.

10. The method of claim 1, further comprising:
determining a collective geometric shape of (i) the freight being carried by the freight-moving vehicle and (ii) at least a portion of the freight-moving vehicle,
isolating a geometric shape of the freight at least in part by segmenting the geometric shape of the at least a portion of the freight-moving vehicle from the collective geometric shape based at least in part on the determined position and orientation of the freight-moving vehicle, and
dimensioning the freight based on the isolated geometric shape of the freight.

11. The method of claim 10, wherein isolating a geometric shape of the freight further comprises:
determining an identity of the freight-moving vehicle, and
receiving a geometric shape of the freight-moving vehicle based on the determined identity,
wherein segmenting the geometric shape of the at least a portion of the freight-moving vehicle from the collective geometric shape is further based on the received geometric shape of the freight-moving vehicle.

12. A system comprising:
an overhead surface comprising a plurality of different portions of varying heights;
a plurality of depth sensors positioned on a freight-moving vehicle, oriented towards the overhead surface disposed above the freight-moving vehicle, and configured to measure respective depths to respective different portions of the overhead surface; and
a processor configured to:
receive respective depth values read by respective depth sensors in the plurality of depth sensors;
determine a position and orientation of the freight-moving vehicle at least in part by querying a lookup table by mapping the received multiple depth values to respective heights of respective different portions of the overhead surface that correspond, in the lookup table, to known positions of the different portions of the overhead surface;
output the determined position and orientation of the freight-moving vehicle, and
dimension a freight carried by the freight-moving vehicle based at least in part on the determined position and orientation of the freight-moving vehicle.

13. The system of claim 12, wherein:
the overhead surface is a planar surface oriented at an angle with respect to the floor surface, and
the multiple depth sensors comprise a first and a second depth sensor, and a third depth sensor not in line with the first and second depth sensors.

14. The system of claim 12, wherein:
the different portions of the overhead surface comprise a grid of depth elements,
the multiple depth sensors comprise a first and a second depth sensor,
a first depth value of the multiple depth values is associated with the first depth sensor, and
a second depth value of the multiple depth values is associated with the second depth sensor.

15. The system of claim 14, wherein each depth element is located at a different height than each of the other depth elements.

16. The system of claim 14, wherein at least one depth element is located at the same height as at least one other depth element.

17. The system of claim 14, wherein the depth elements are spaced one centimeter apart.

18. The system of claim 12, wherein at least one of the multiple depth sensors is a LIDAR sensor.

19. The system of claim 12, wherein the processor is further configured to:
determine a collective shape of (i) the freight being carried by the freight-moving vehicle and (ii) at least a portion of the freight-moving vehicle,
isolate a geometric shape of the freight at least in part by segmenting the geometric shape of the at least a portion of the freight-moving vehicle from the collective geometric shape based at least in part on the determined position and orientation of the freight-moving vehicle, and
output the isolated geometric shape of the freight.

20. A system comprising:
an overhead grid comprising a plurality of depth elements of varying heights;
at least three depth sensors positioned on a freight-moving vehicle and oriented towards the overhead grid disposed above the freight-moving vehicle, the at least three depth sensors configured to measure a respective depth to a respective depth element positioned above the respective depth sensor, and
a processor configured to:
receive respective depth values read by the at least three depth sensors;
determine a position and orientation of the freight-moving vehicle at least in part by querying a database by mapping the received respective depth values to respective heights of respective depth elements in the overhead grid that correspond, in the database, to known Cartesian positions of the depth elements in the overhead grid;
determine a collective geometric shape of (i) freight being carried by the freight-moving vehicle and (ii) at least a portion of the freight-moving vehicle;
isolate a geometric shape of the freight at least in part by segmenting the geometric shape of the at least a portion of the freight-moving vehicle from the collective geometric shape based at least in part on the determined position and orientation of the freight-moving vehicle,
output the isolated geometric shape of the freight, and
dimension the freight carried by the freight-moving vehicle based at least in part on the determined position and orientation of the freight-moving vehicle and the isolated geometric shape of the freight.

\* \* \* \* \*